United States Patent
Cheng et al.

(10) Patent No.: US 11,460,094 B1
(45) Date of Patent: Oct. 4, 2022

(54) SPACER AND CYCLOIDAL REDUCER WITH THE SPACER

(71) Applicant: HIWIN TECHNOLOGIES CORP., Taichung (TW)

(72) Inventors: Hsu-Min Cheng, Taichung (TW); Tsung-Wen Peng, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 0 days.

(21) Appl. No.: 17/523,342

(22) Filed: Nov. 10, 2021

(51) Int. Cl.
| | |
|---|---|
| *F16C 33/37* | (2006.01) |
| *F16H 13/08* | (2006.01) |
| *F16H 1/32* | (2006.01) |

(52) U.S. Cl.
CPC ......... *F16H 13/08* (2013.01); *F16C 33/3706* (2013.01); *F16H 1/32* (2013.01)

(58) Field of Classification Search
CPC ...... F16H 13/08; F16H 1/32–2001/328; F16C 33/3706
See application file for complete search history.

(56) References Cited

U.S. PATENT DOCUMENTS

| | | | | |
|---|---|---|---|---|
| 1,261,154 A | * | 4/1918 | Newmann | F16C 33/3706 384/520 |
| 4,479,683 A | | 10/1984 | Kanamaru | |
| 5,954,609 A | * | 9/1999 | Fecko | F16H 1/32 384/619 |
| 7,278,332 B2 | * | 10/2007 | Nakatani | F16H 25/2238 74/89.44 |
| 8,753,019 B2 | * | 6/2014 | Kikuchi | F16C 33/30 384/551 |
| 9,995,340 B2 | | 6/2018 | Ovize et al. | |

FOREIGN PATENT DOCUMENTS

| | | | | |
|---|---|---|---|---|
| JP | 2007010060 A | * | 1/2007 | .......... F16C 33/3706 |
| WO | WO-2006051706 A1 | * | 5/2006 | .......... F16C 33/3706 |

* cited by examiner

*Primary Examiner* — Sherry L Estremsky
(74) *Attorney, Agent, or Firm* — Muncy, Geissler, Olds & Lowe, P.C.

(57) ABSTRACT

A spacer includes a first surface and a second surface. The first surface and the second surface respectively have two opposite first roller accommodating grooves and two opposite second roller accommodating grooves. The first and second roller accommodating grooves of the first surface correspond to the second and first roller accommodating grooves of the second surface. The spacer defines a reference plane, which is perpendicular to a horizontal direction and passes through a center point of the maximum thickness of the spacer. The horizontal distance from the reference plane to the center of each first roller accommodating groove is different from the horizontal distance from the reference plane to the center of each second roller accommodating groove. By flipping the spacer of the present invention, the spacing of two adjacent rollers can be adjusted. In addition, the present invention further provides a cycloidal reducer with the aforementioned spacer.

10 Claims, 12 Drawing Sheets

SPACER AND CYCLOIDAL REDUCER WITH THE SPACER

BACKGROUND OF THE INVENTION

1. Field of the Invention

The present invention relates to spacers, and in particular refers to a spacer and a cycloidal reducer with the spacer.

2. Description of the Related Art

Roller screws, roller linear slides or roller bearings commonly used in precision machinery mainly use multiple rollers as the transmission interface. A spacer is usually set between two adjacent rollers to avoid direct collision and damage to two adjacent rollers, and at the same time achieve the effect of reducing noise. For example, patent documents such as U.S. Pat. Nos. 4,479,683 and 9,995,340 all disclose relevant structural designs.

However, in order to be able to adjust the spacing of two adjacent rollers, the traditional way is usually to prepare at least two spacers with different thicknesses, and to achieve the effect of adjusting the spacing by replacing spacers with different thicknesses. However, it will take more time in the replacement process, so it is more troublesome and inconvenient in assembly. In addition, a variety of spacers with different thicknesses need to make a variety of different molds, so the manufacturing cost is relatively high.

SUMMARY OF THE INVENTION

The present invention has been accomplished under the circumstances in view. It is the main object of the present invention to provide a spacer that uses the distance difference between the centers of different roller accommodating grooves and a reference plane to adjust the spacing of two adjacent rollers, which can reduce the difficulty of assembly and save manufacturing costs.

To achieve the above objective of the present invention, the spacer of the present invention comprises a first surface and a second surface facing away from the first surface. The first surface and the second surface respectively have two first roller accommodating grooves opposite to each other and two second roller accommodating grooves opposite to each other. The two first roller accommodating grooves of the first surface and the two second roller accommodating grooves of the first surface are staggered relative to the center of the first surface. The two first roller accommodating grooves of the second surface and the two second roller accommodating grooves of the second surface are staggered relative to the center of the second surface. The two first roller accommodating grooves of the first surface correspond to the two second roller accommodating grooves of the second surface, and the two second roller accommodating grooves of the first surface correspond to the two first roller accommodating grooves of the second surface. The spacer defines a reference plane, which is perpendicular to a horizontal direction and passes through a center point of the maximum thickness of the spacer. The horizontal distance from the reference plane to the center of each first roller accommodating groove is defined as L1, the horizontal distance from the reference plane to the center of each second roller accommodating groove is defined as L2, and both satisfy the relationship of L1>L2. Thus, the spacer of the present invention can change the spacing of two adjacent rollers after turning 90 degrees.

It can be seen from the above that by flipping the spacer of the present invention, the spacer of the present invention can use the distance difference between the first roller accommodating grooves, the second roller accommodating grooves and the reference plane to adjust the spacing of two adjacent rollers. Not only can it effectively reduce assembly man-hours, but it also does not need to make a variety of different molds, so it can reduce manufacturing costs.

Preferably, the first surface further comprises a first convex portion at the junction of each first roller accommodating groove of the first surface and each adjacent second roller accommodating groove of the first surface. The second surface further comprises a second convex portion at the junction of each first roller accommodating groove of the second surface and each adjacent second roller accommodating groove of the second surface. The second convex portions correspond to the first convex portions in a one-to-one manner. The maximum distance between the reference plane and one first convex portion is equal to the maximum distance between the reference plane and one second convex portion.

Preferably, there is a distance difference between L1 and L2. The distance difference varies according to the size of the input flange or output flange used with the spacer of the present invention, and in this embodiment is between 0.1 mm-0.4 mm.

Preferably, the first convex portions and the second convex portions each have a rounded corner. When the assembly position is deviated, the spacer of the present invention can achieve the effect of automatic correction through the rounded corners.

Preferably, the cross-sectional shape of the first roller accommodating grooves and the cross-sectional shape of the second roller accommodating grooves are arc-shaped, and the first roller accommodating grooves and the second roller accommodating grooves have the same curvature. Thereby, when used with the rollers, the first roller accommodating grooves and the second roller accommodating grooves will form surface contact with the rollers to provide a supporting effect for the rollers.

Preferably, the cross-sectional shape of the first roller accommodating grooves and the cross-sectional shape of the second roller accommodating grooves are rounded triangles, and the first roller accommodating grooves and the second roller accommodating grooves have the same size. As a result, when used in conjunction with the rollers, the first roller accommodating grooves and the second roller accommodating grooves will form line contact with the rollers to reduce the friction between each other and effectively prevent stress concentration.

Preferably, the outer periphery of the spacer further has four identification portions (such as concavities). The identification portions correspond to the first roller accommodating grooves or the second roller accommodating grooves in a one-to-one manner to facilitate user identification and improve assembly efficiency.

Preferably, the first surface and the second surface are penetrated by an oil reservoir for storing lubricating oil.

On the other hand, the present invention further provides a cycloidal reducer, which comprises a housing, a rotating shaft, an input flange, an output flange, a reduction gear, a plurality of rollers and a plurality of the aforementioned spacers. The rotating shaft rotatably penetrates the housing and has an input end and an output end. The input flange is rotatably installed at one end of the housing and rotatably assembled at the input end of the rotating shaft. The output flange is rotatably installed at an opposite end of the housing and rotatably assembled at the output end of the rotating shaft and connected with the input flange. The reduction gear comprises at least one cycloidal wheel and at least one Oldham coupling. The cycloidal wheel is eccentrically assembled on the rotating shaft. The Oldham coupling is set between the cycloidal wheel and the input flange or between the cycloidal wheel and the output flange. The rollers are set between the housing and the input flange and between the housing and the output flange. Each spacer is set between two adjacent rollers. Each spacer optionally uses the first roller accommodating grooves or the second roller accommodating grooves of the first surface to support one roller and each spacer optionally uses the first roller accommodating grooves or the second roller accommodating grooves of the second surface to support another roller. As a result, when the cycloidal wheel is driven by the rotating shaft, it will produce a cycloidal rotation relative to the housing, then the input flange and the output flange are linked through the Oldham coupling, so that the input flange and the output flange are rotated relative to the housing through the rollers, thereby achieving the effect of decelerating rotation.

The detailed structure, features, assembly or use of the spacer and the cycloidal reducer with the spacer provided by the present invention will be described in the detailed description of the subsequent preferred embodiment. However, those with ordinary knowledge in the field of the present invention should be able to understand that the detailed description and specific embodiment listed in the implementation of the present invention are only used to illustrate the present invention, and are not intended to limit the scope of the patent application of the present invention.

DETAILED DESCRIPTION OF THE INVENTION

Figure 1:
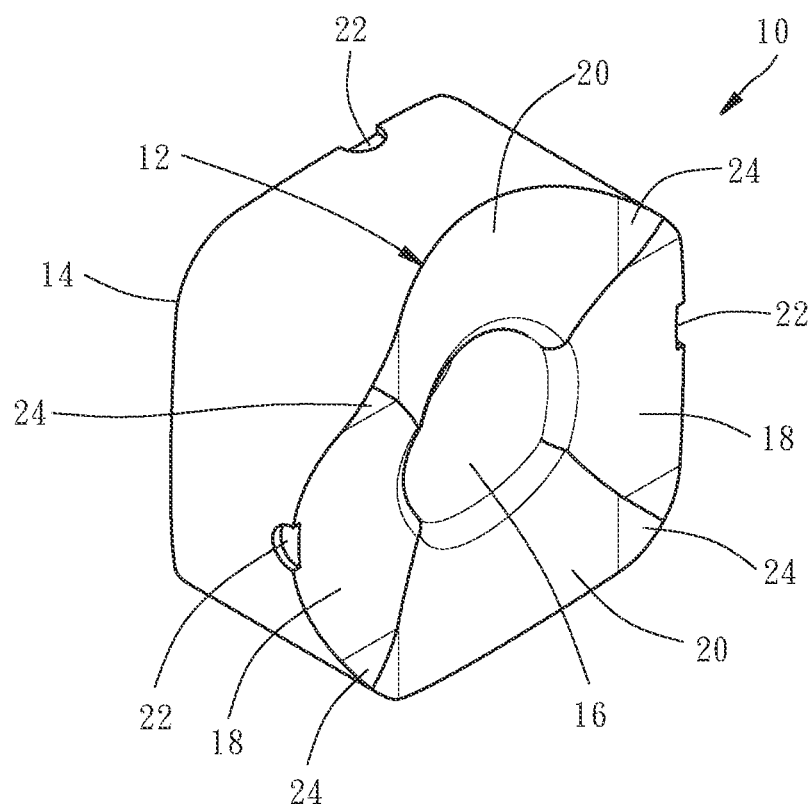
FIG. 1 is an oblique top elevational view of the spacer according to the first embodiment of the present invention.

The applicant first declares here, in the entire specification, including the embodiments described below and the claims of the patent application, the nouns relating to directionality are based on the directions in the drawings. Secondly, in the embodiments and drawings which will be described below, the same reference numerals are given to the same or similar elements or structural features thereof.

Figure 2:
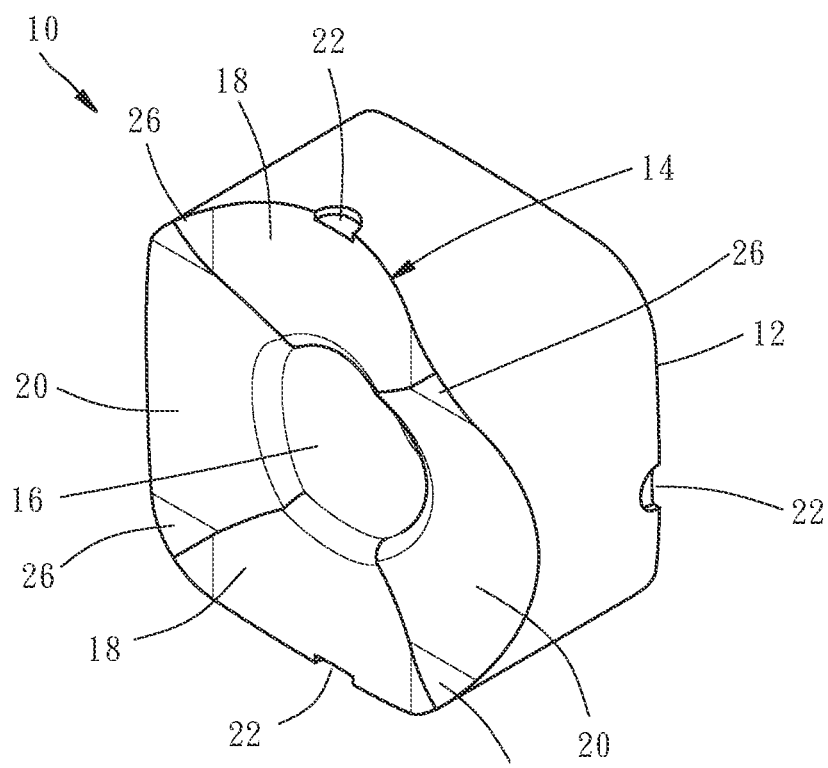
FIG. 2 is an oblique top elevational of the spacer according to the first embodiment of the present invention viewed from another angle.

Referring to FIG. 1 and FIG. 2, the spacer 10 according to the first embodiment of the present invention comprises a first surface 12, a second surface 14 facing away from the first surface 12, and an oil reservoir 16 penetrating through the first surface 12 and the second surface 14. The first surface 12 and the second surface 14 respectively have two first roller accommodating grooves 18 opposite to each other and two second roller accommodating grooves 20 opposite to each other. In this embodiment, the cross-sectional shape of the first roller accommodating grooves 18 and the cross-sectional shape of the second roller accommodating grooves 20 are arc-shaped, and the first roller accommodating grooves 18 and the second roller accommodating grooves 20 have the same curvature.

Please continue to refer to FIG. 1 and FIG. 2. The two first roller accommodating grooves 18 of the first surface 12 and the two second roller accommodating grooves 20 of the first surface 12 are staggered relative to the center of the first surface 12. The two first roller accommodating grooves 18 of the second surface 14 and the two second roller accommodating grooves 20 of the second surface 14 are staggered relative to the center of the second surface 14. The two first roller accommodating grooves 18 of the first surface 12 correspond to the two second roller accommodating grooves 20 of the second surface 14, and the two second roller accommodating grooves 20 of the first surface 12 correspond to the two first roller accommodating grooves 18 of the second surface 14, that is, the arrangement of the two first roller accommodating grooves 18 and the two second roller accommodating grooves 20 on the first surface 12 and the arrangement of the two first roller accommodating grooves 18 and the two second roller accommodating grooves 20 on the second surface 14 differ by 90 degrees.

In order to facilitate a user to identify the location of the first roller accommodating grooves 18 and the second roller accommodating grooves 20, the outer periphery of the spacer 10 can be further provided with four identification portions 22 (here, concavities are taken as an example, but not limited to concavities). As shown in FIGS. 1 and 2, the identification portions 22 correspond to the first roller accommodating grooves 18 or the second roller accommodating grooves 20 in a one-to-one manner. In this embodiment, the identification portions 22 correspond to the first roller accommodating grooves 18 in a one-to-one manner.

Figure 3:
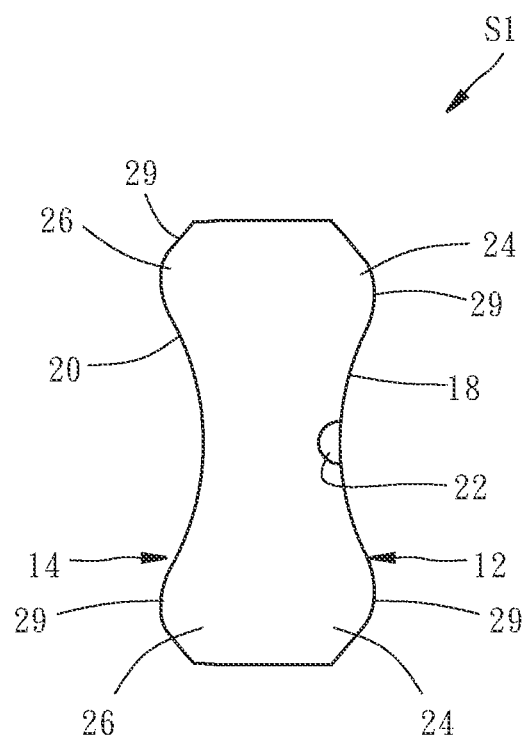
FIG. 3 is a side view of the spacer in the first use state according to the first embodiment of the present invention.
Figure 4:
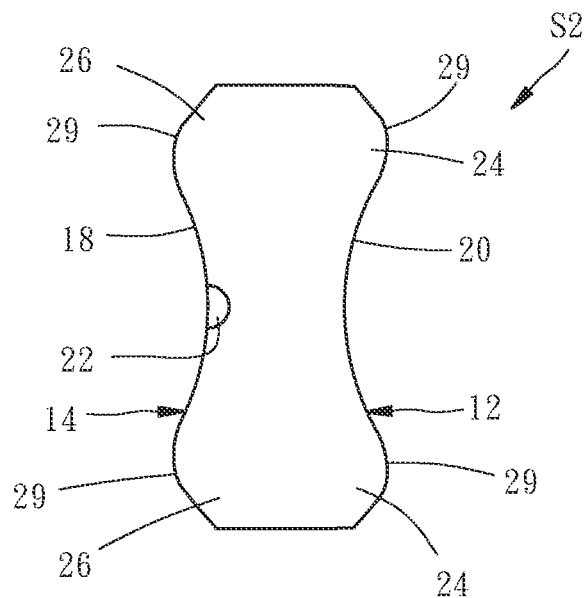
FIG. 4 is a side view of the spacer in the second use state according to the first embodiment of the present invention.
Figure 5:
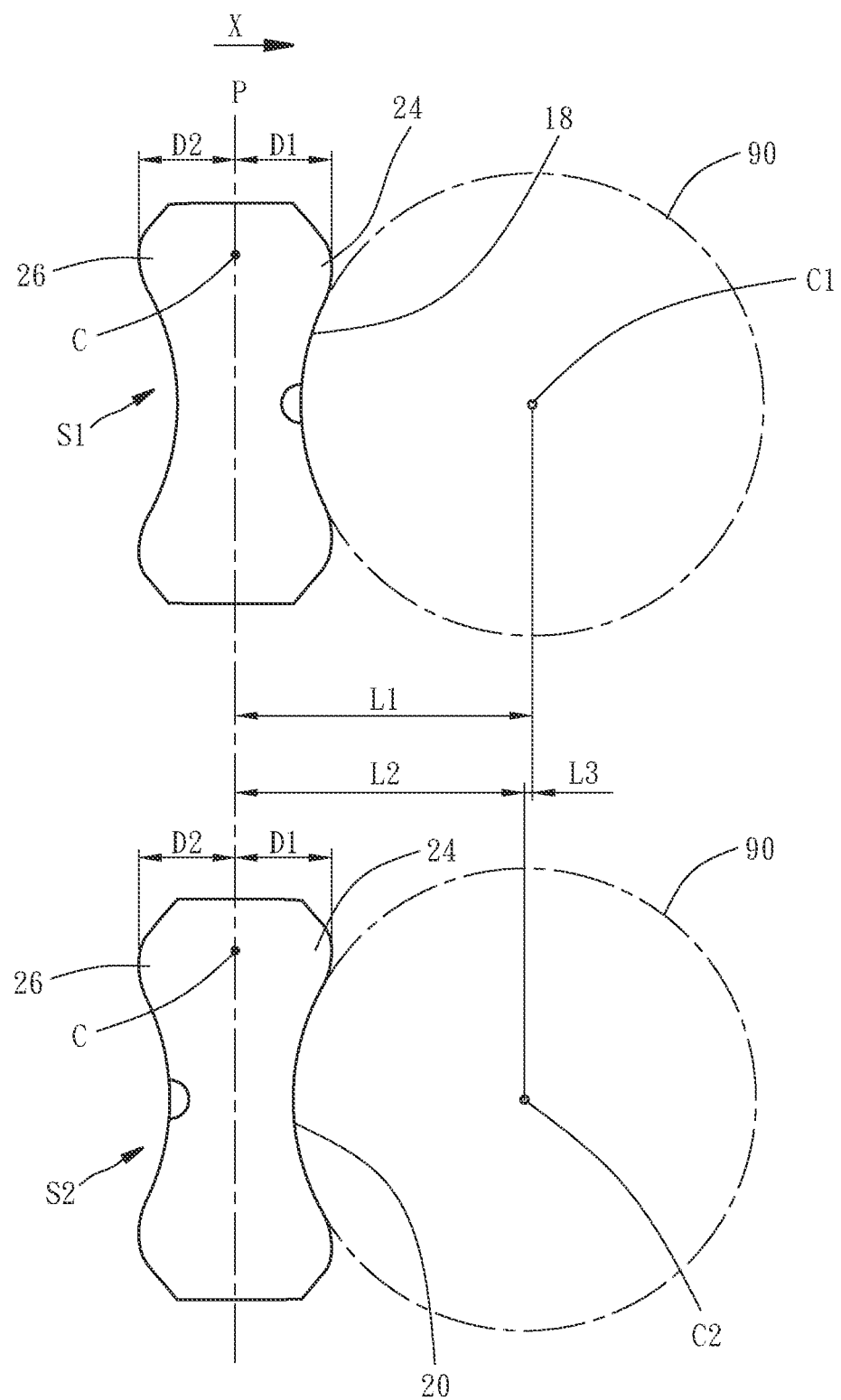
FIG. 5 is a plan view of the spacer according to the first embodiment of the present invention, which shows the distance difference before and after the 90-degree flip.
Figure 6:
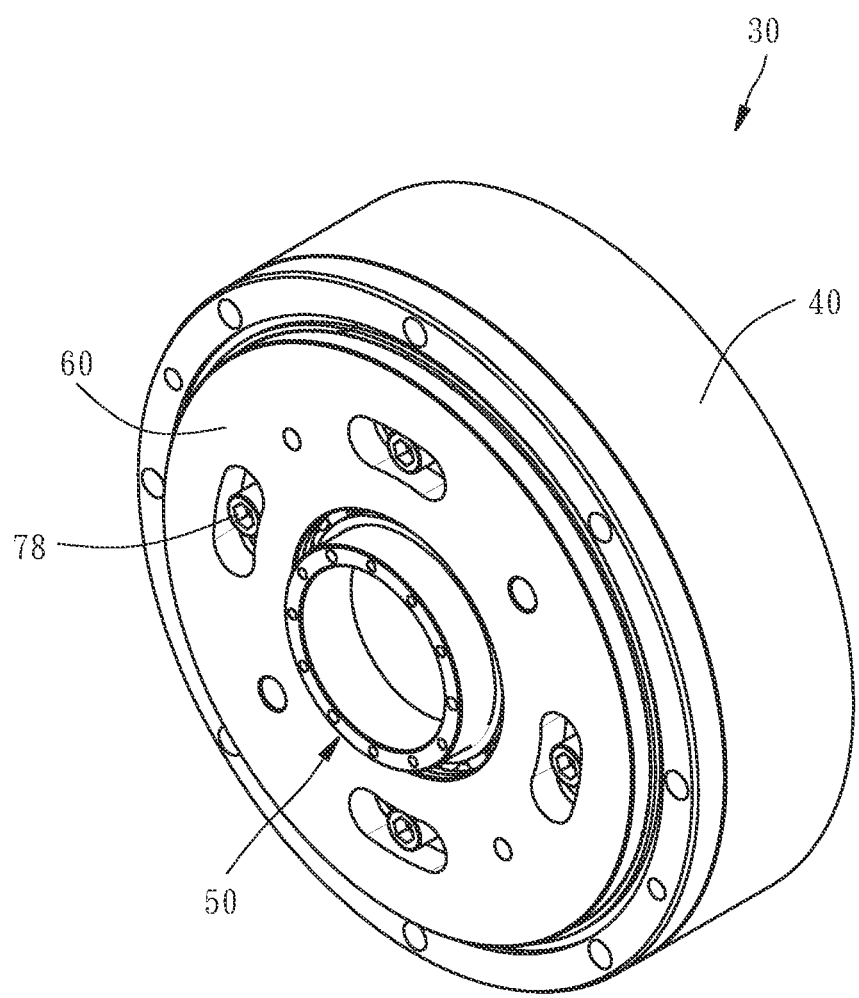
FIG. 6 is an oblique top elevational view of the cycloidal reducer of the present invention.
Figure 7:
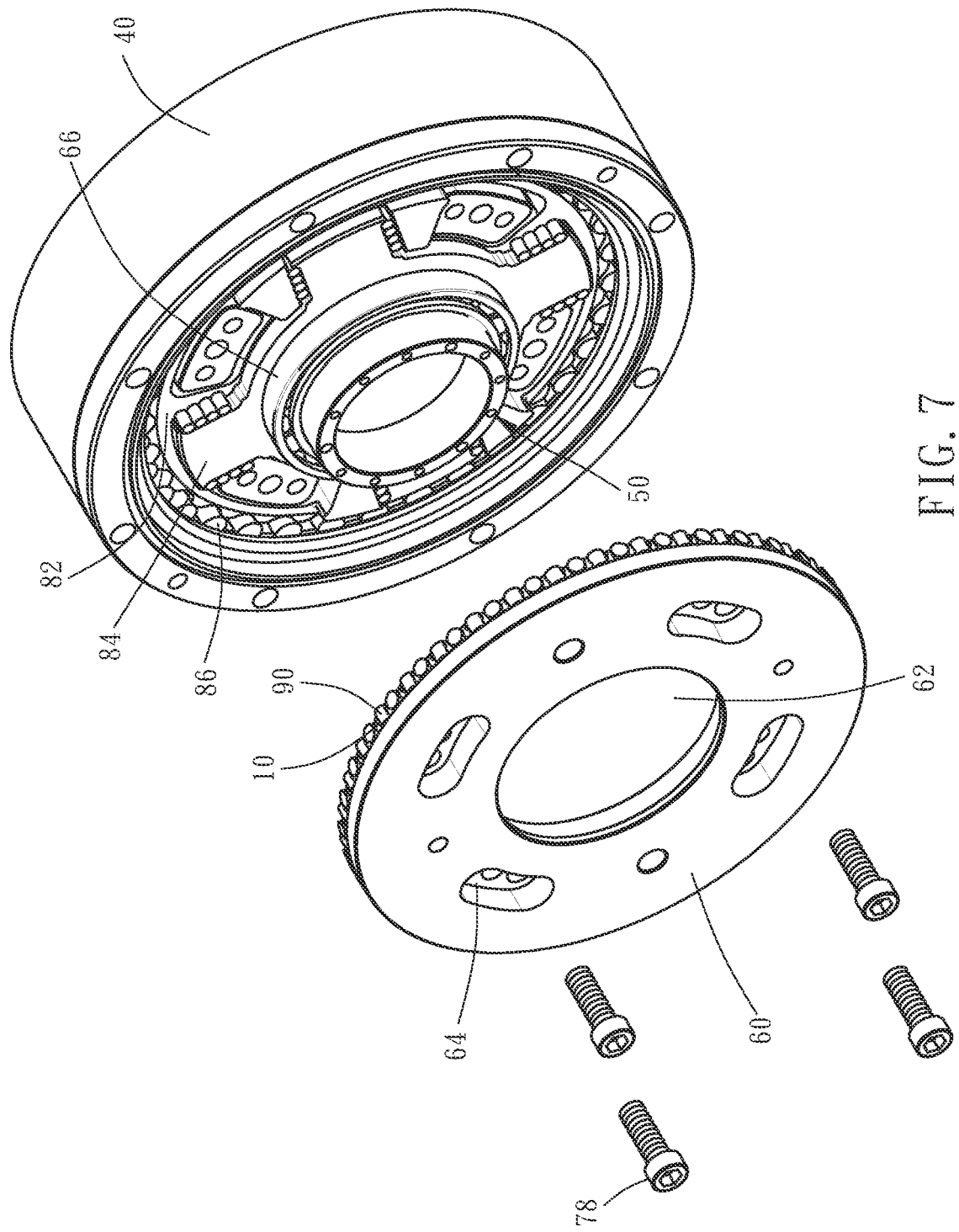
FIG. 7 is a partial exploded view of FIG. 6.
Figure 8:
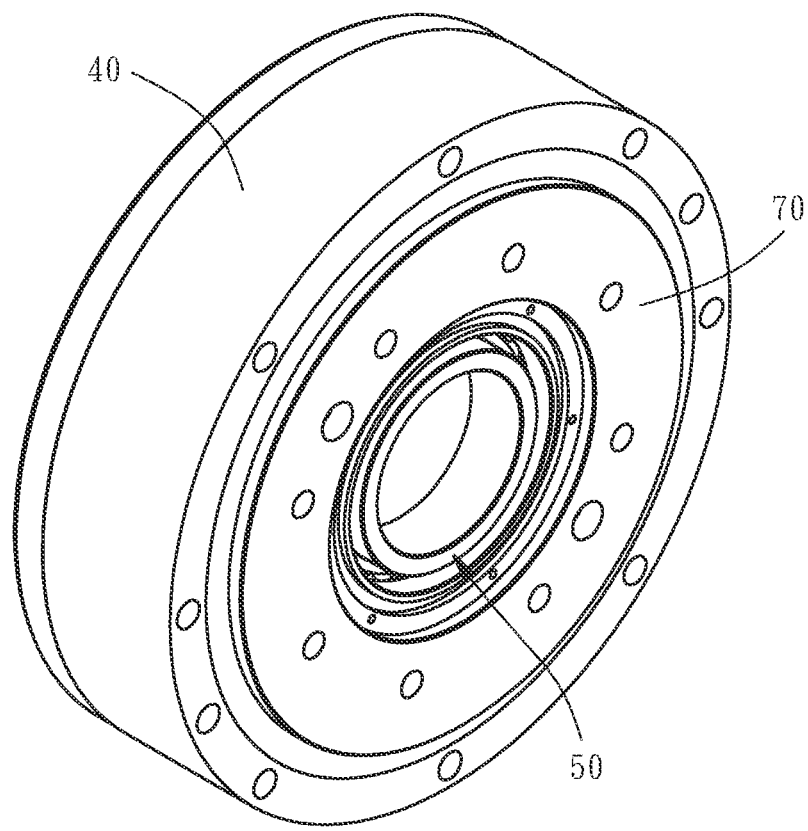
FIG. 8 is an oblique top elevational view of the cycloidal reducer of the present invention viewed from another angle.
Figure 9:
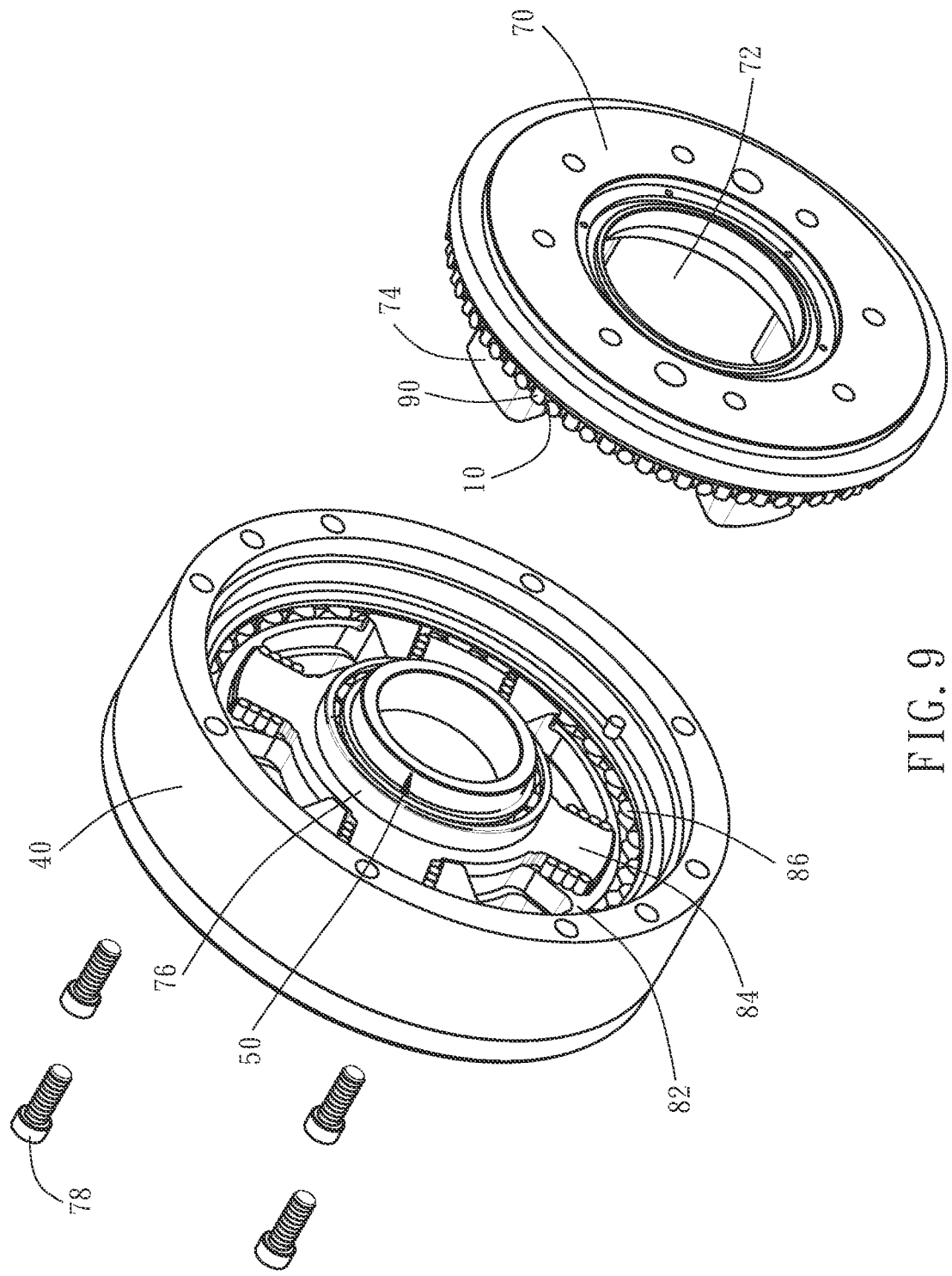
FIG. 9 is a partial exploded view of FIG. 8.
Figure 10:
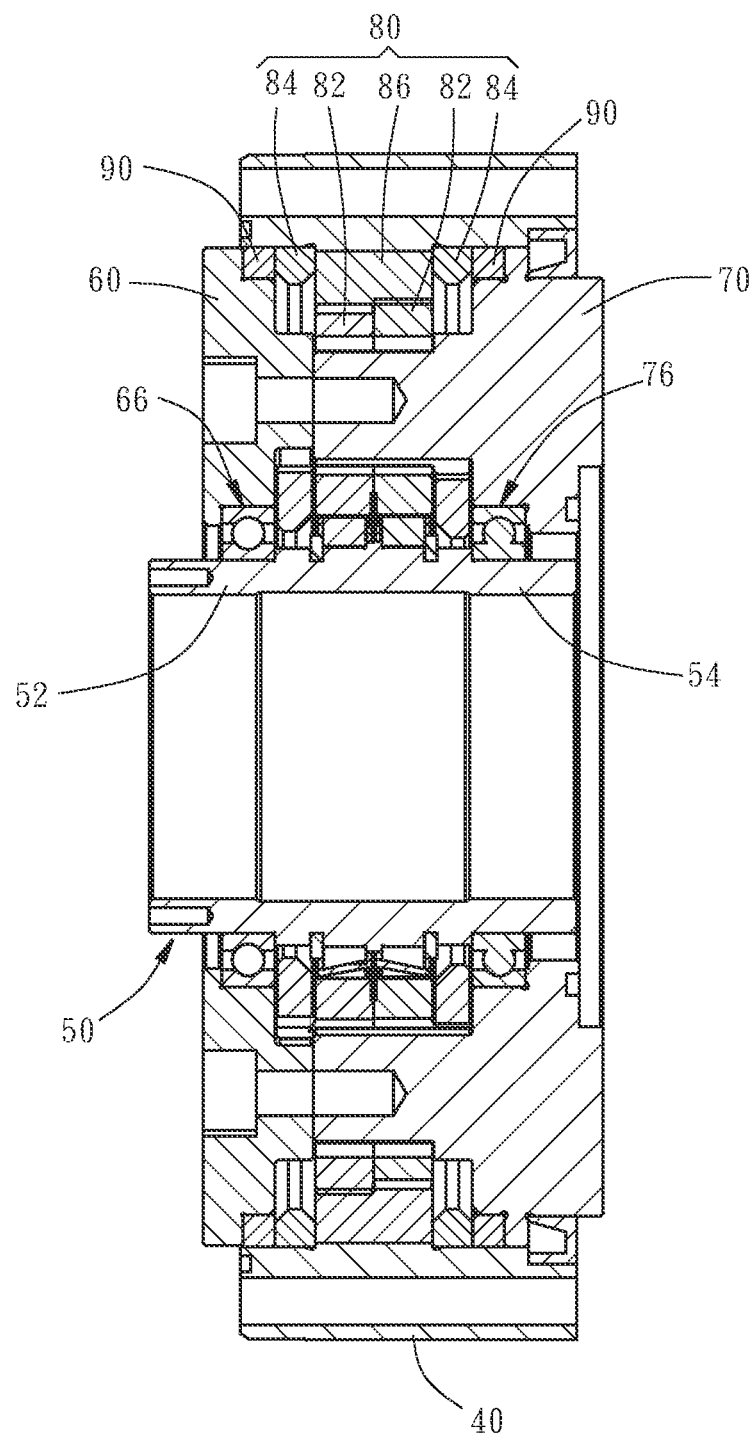
FIG. 10 is a cross-sectional view of the cycloidal reducer of the present invention.

As shown in FIGS. 3-5, the spacer 10 defines a reference plane P, which is perpendicular to a horizontal direction X and passes through a center point C of the maximum thickness of the spacer 10. As far as the relationship between the reference plane P and the first surface 12 is concerned, the horizontal distance from the reference plane P to the center C1 of each first roller accommodating groove 18 is defined as L1, the horizontal distance from the reference plane P to the center C2 of each second roller accommodating groove 20 is defined as L2, and both satisfy the relationship of L1>L2. Thereby, when the spacer 10 is turned 90 degrees from a first use state S1 shown in FIG. 3 to a second use state S2 shown in FIG. 4, the distance between the reference plane P and the center of a roller 90 will change. The relationship between reference plane P and second surface 14 is also the same, so the detailed configuration will not be repeatedly mentioned hereunder. Furthermore, the first surface 12 has a first convex portion 24 at the junction of each first roller accommodating groove 18 and each adjacent second roller accommodating groove 20, that is, as shown in FIG. 1, the first surface 12 has four first convex portions 24. The second surface 14 has a second convex portion 26 at the junction of each first roller accommodating groove 18 and each adjacent second roller accommodating groove 20, that is, as shown in FIG. 2, the second surface 14 has four second convex portions 26. The second convex portions 26 correspond to the first convex portions 24 in a one-to-one manner.

Referring to FIG. 6 to FIG. 10, the spacer 10 of the present invention is mainly applied to a cycloidal reducer 30. The cycloidal reducer 30 comprises a housing 40, a rotating shaft 50, an input flange 60, an output flange 70, a reduction gear 80, a plurality of the rollers 90, and a plurality of the spacers 10.

The rotating shaft 50 penetrates the housing 40 in a rotatable manner and has an input end 52 and an output end 54.

The input flange 60 is set at one end of the housing 40. The input flange 60 has a first shaft hole 62 at the center. The input flange 60 is sleeved on the input end 52 of the rotating shaft 50 by using the first shaft hole 62. A first bearing 66 is arranged between the input end 52 of the rotating shaft 50 and the input flange 60, so that the rotating shaft 50 and the input flange 60 are rotated relatively through the first bearing 66. In addition, the input flange 60 has four first connecting pillars 64 around the first shaft hole 62.

The output flange 70 is set at the other end of housing 40. The output flange 70 has a second shaft hole 72 at the center. The output flange 70 is set on the output end 54 of the rotating shaft 50 by using the second shaft hole 72. A second hearing 76 is arranged between the output end 54 of the rotating shaft 50 and the output flange 70, so that the rotating shaft 50 and the output flange 70 are rotated relatively through the second bearing 76, In addition, the inner peripheral surface of the output flange 70 has four second connecting pillars 74 around the second shaft hole 72, The four first connecting pillars 64 of the input flange 60 and the four second connecting pillars 74 of the output flange 70 are connected by four bolts 78 to assemble the two together.

The reduction gear 80 comprises two cycloidal wheels 82, two Oldham couplings 84 and a plurality of roller pins 86. The two cycloidal wheels 82 are arranged side by side and eccentrically sleeved in the center of the rotating shaft 50. The two cycloidal wheels 82 are penetrated by the four second connecting pillars 74 of the output flange 70. One Oldham coupling 84 is set between the input flange 60 and the cycloidal wheels 82, and the other Oldham coupling 84 is set between the output flange 70 and the cycloidal wheels 82. The roller pins 86 are arranged between the inner peripheral surface of the housing 40 and the outer peripheral surface of the cycloidal wheels 82, so that the cycloidal wheels 82 can be operated stably. Thereby, when the cycloidal wheels 82 are driven by the rotating shaft 50, they will produce a cycloidal rotation relative to the housing 40, then through the Oldham couplings 84, the input flange 60 and the output flange 70 are linked, so that the input flange 60 and the output flange 70 are rotated relative to the housing 40 to achieve the effect of decelerating the rotation.

Figure 11A:
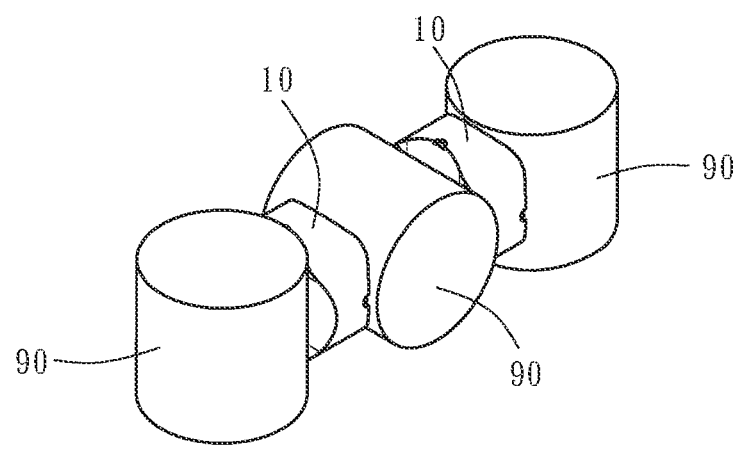
FIGS. 11a-11c are oblique top elevational views of spacers used in conjunction with rollers in the first embodiment of the present invention, showing different assembly methods of rollers.
Figure 11B:
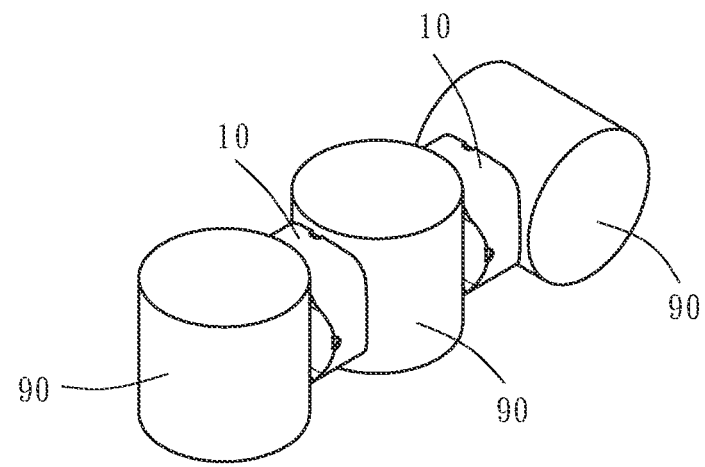
Figure 11C:
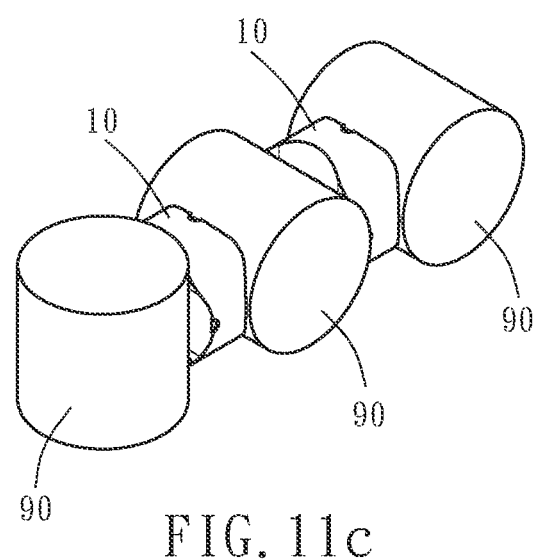

The rollers 90 are disposed between the housing 40 and the input flange 60 and between the housing 40 and the output flange 70 to serve as a transmission interface between the housing 40 and the input flange 60 and between the housing 40 and the output flange 70, What needs to be added here is that the arrangement of the rollers 90 can be adjusted according to actual needs. For example, in normal use, they are arranged in a cross pattern as shown in FIG. 11a. If a higher radial load is required, some rollers 90 can be adjusted to be arranged as shown in FIG. 11b. If a higher axial load is required, some rollers 90 can also be adjusted to the arrangement shown in FIG. 11c.

Each spacer 10 is set between two adjacent rollers 90. Since each spacer 10 can be flipped in two different use states, and the rollers 90 can be selectively adjusted in arrangement, therefore, on the one hand, each spacer 10 uses the first roller accommodating grooves 18 of the first surface 12 or the second roller accommodating grooves 20 of the first surface 12 to support one of the rollers 90, and on the other hand, each spacer 10 uses the second roller accommodating grooves 20 of the second surface 14 or the first roller accommodating grooves 18 of the second surface 14 to support another roller 90.

Figure 12:
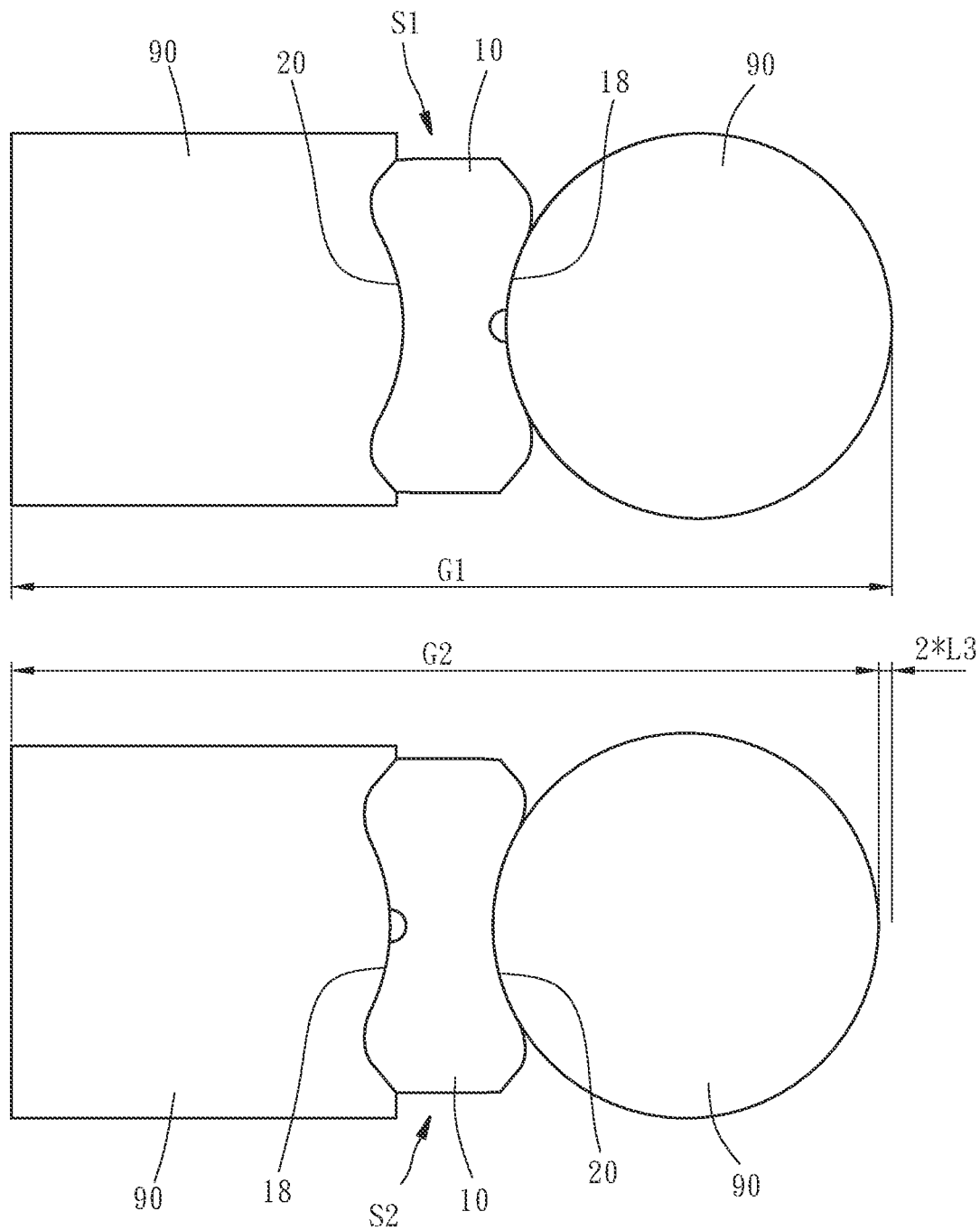
FIG. 12 is a plan view of the spacer used with the rollers in different use states according to the first embodiment of the present invention.

From the above we can see, after the installation of the spacer 10 is completed, the roller 90 on the same side will have a distance difference of L3 due to the spacer 10 in two different use states, and the roller 90 on the other side will also have a distance difference of L3. Therefore, the spacer 10 is flipped manually to adjust the distance between two adjacent rollers 90 by using the aforementioned distance difference L3. As shown in FIG. 12, when the spacer 10 is in the first use state S1, the distance between the leftmost end of the roller 90 on the left and the rightmost end of the roller 90 on the right is G1. When the spacer 10 is turned to the second use state S2, the distance between the leftmost end of the roller 90 on the left and the rightmost end of the roller 90 on the right is G2. The difference between G1 and G2 is twice the distance difference (2×L3). As a result, the present invention does not need to be adjusted by replacing spacers of different thicknesses as in the prior art, as long as it is turned 90 degrees to a different use state, the effect of adjusting the spacing can be achieved. Not only can it effectively reduce assembly man-hours, but it also does not need to make a variety of different molds, so it can reduce manufacturing costs. In addition, each first convex portion 24 and each second convex portion 26 may have a design with rounded corners 29 (as shown in FIGS. 3 and 4). When the assembly position of the spacers 10 is deviated, the rounded corners 29 can be used to achieve the effect of automatic correction, without manual adjustment.

Figure 13:
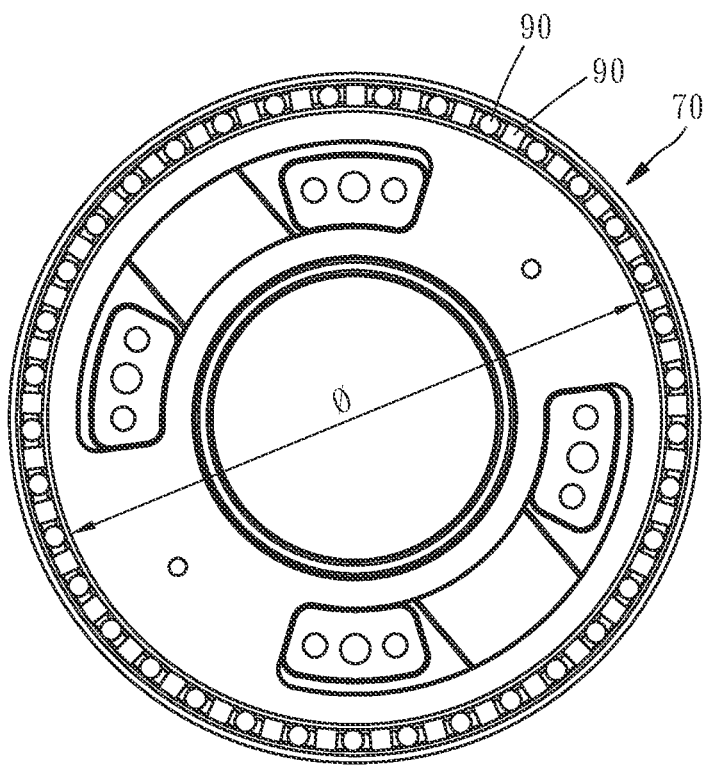
FIG. 13 is a combined plan view of the output flange and the rollers provided by the present invention.
Figure 14:
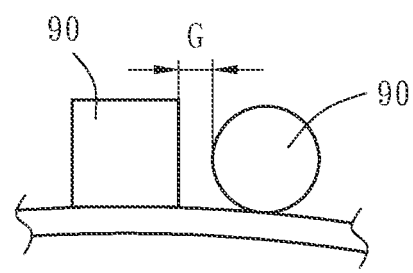
FIG. 14 is a partial enlarged view of FIG. 13.

On the other hand, the distance difference L3 produced by the spacers 10 under different usage conditions will vary depending on the size of the input flange 60 or output flange 70 it is used with. Please refer to FIG. 13 and FIG. 14 (In FIG. 13, the output flange 70 is taken as an example, and the situation of the input flange 60 is the same, so it will not be drawn separately here). Assuming that the diameter of the output flange 70 is $\Psi$, and the spacing between two adjacent rollers 90 is G, if the diameter p is smaller, the arrangement of the rollers 90 will require a larger spacing G due to the relationship of curvature. Conversely, if the diameter $\Psi$ is larger, the arrangement of the rollers 90 also needs to make the spacing G smaller due to the relationship of curvature, that is, the spacing G will change within a certain range according to the diameter $\Psi$. In order to match the change of the spacing G, the distance difference L3 is between 0.1 mm and 0.4 mm in this embodiment.

Figure 15:
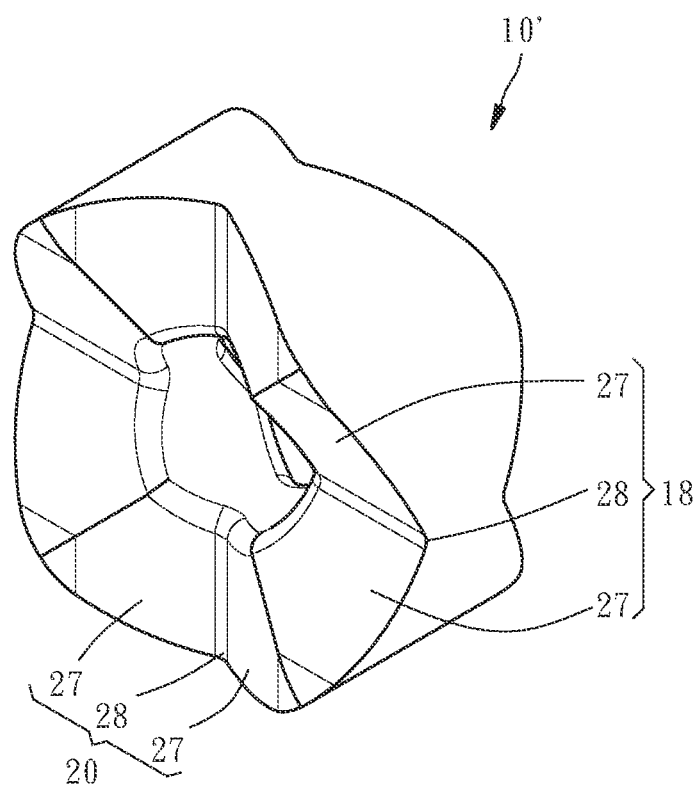
FIG. 15 is an oblique top devotional view of the spacer according to the second embodiment of the present invention.
Figure 16:
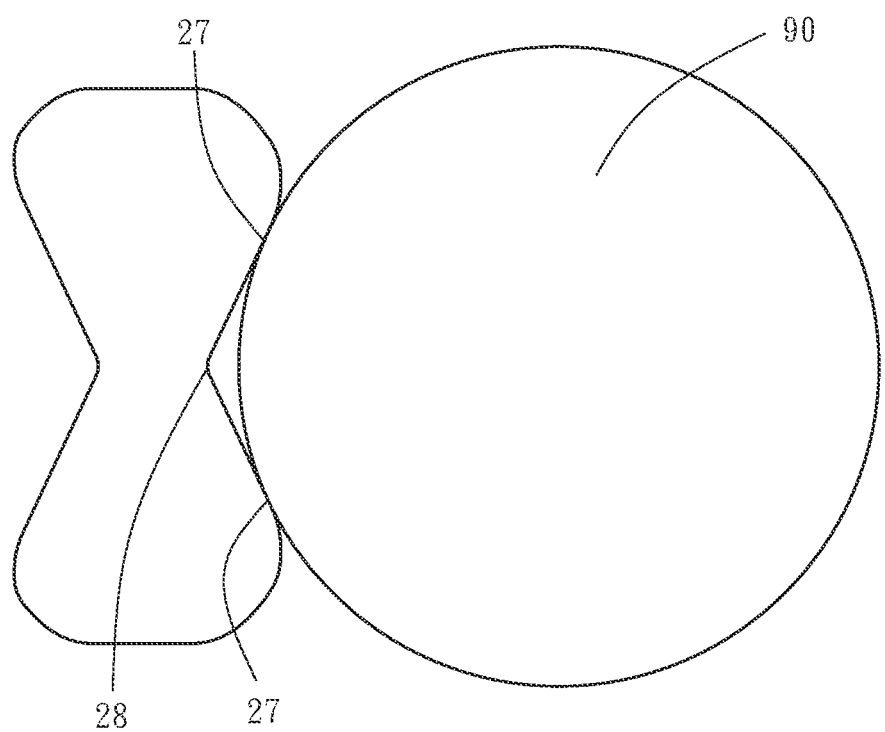
FIG. 16 is a side view of the spacer according to the second embodiment of the present invention.

What needs to be added here is, the cross-sectional shape of the first roller accommodating grooves 18 and the cross-sectional shape of the second roller accommodating grooves 20 are not limited to arcs, and they are both rounded triangles in the second embodiment of the present invention, that is, both have two inclined surfaces 27 and an arc surface 28 connected between the two inclined surfaces 27, as shown in FIGS. 15 and 16. Moreover, the first roller accommodating grooves 18 and the second roller accommodating grooves 20 have the same size. In this way, when used with the rollers 90, the two inclined surfaces 27 and the rollers 90 will form a line contact to reduce the friction between each other and effectively prevent stress concentration. As for the second embodiment of the present invention, the operation of the spacers 10' and the effects that can be achieved are the same as those of the first embodiment described above, which will not be repeated here.

What is claimed is:

1. A spacer comprising a first surface and a second surface facing away from said first surface, said first surface and said second surface respectively having two first roller accommodating grooves opposite to each other and two second roller accommodating grooves opposite to each other, said two first roller accommodating grooves of said first surface and said two second roller accommodating grooves of said first surface being staggered relative to a center of said first surface, said two first roller accommodating grooves of said second surface and said two second roller accommodating grooves of said second surface being staggered relative to a center of said second surface, said two first roller accommodating grooves of said first surface corresponding to said two second roller accommodating grooves of said second surface, and said two second roller accommodating grooves of said first surface corresponding to said two first roller accommodating grooves of said second surface, wherein said spacer defines a reference plane, which is perpendicular to a horizontal direction and passes through a center point of a maximum thickness of said spacer; a horizontal distance from said reference plane to a center of each said first roller accommodating groove is defined as L1, the horizontal distance from said reference plane to a center of each said second roller accommodating groove is defined as L2, and both satisfy the relationship of L1>L2.

2. The spacer as claimed in claim 1, wherein said first surface further comprises a first convex portion at the junction of each said first roller accommodating groove of said first surface and each adjacent said second roller accommodating groove of said first surface, said second surface further comprises a second convex portion at the junction of each said first roller accommodating groove of said second surface and each adjacent said second roller accommodating groove of said second surface, and said second convex portions correspond to said first convex portions one-to-one; a maximum distance between said reference plane and one said first convex portion is equal to a maximum distance between said reference plane and one said second convex portion.

3. The spacer as claimed in claim 2, Wherein said first convex portions and said second convex portions each have a rounded corner.

4. The spacer as claimed in claim 1, wherein a distance difference exists between L1 and L2, and said distance difference is between 0.1 mm-0.4 mm.

5. The spacer as claimed in claim 1, wherein the cross-sectional shape of said first roller accommodating grooves and the cross-sectional shape of said second roller accommodating grooves are arc-shaped, and said first roller accommodating grooves and said second roller accommodating grooves have the same curvature.

6. The spacer as claimed in claim 1, wherein the cross-sectional shape of said first roller accommodating grooves and the cross-sectional shape of said second roller accommodating grooves are rounded triangles, and said first roller accommodating grooves and said second roller accommodating grooves have the same size.

7. The spacer as claimed in claim 1, further comprising four identification portions, said identification portions corresponding to said first roller accommodating grooves or said second roller accommodating grooves in a one-to-one manner.

8. The spacer as claimed in claim 7, wherein each said identification portion is a concavity.

9. The spacer as claimed in claim 1, further comprising an oil reservoir penetrating through the center of said first surface and the center of said second surface.

10. A cycloidal reducer, comprising:
a housing;
a rotating shaft rotatably penetrating said housing, said rotating shaft comprising an input end and an output end;
an input flange rotatably installed at one end of said housing and rotatably assembled at said input end of said rotating shaft;
an output flange rotatably installed at an opposite end of said housing and rotatably assembled at said output end of said rotating shaft and connected with said input flange;
a reduction gear comprising at least one cycloidal wheel and at least one Oldham coupling, said at least one cycloidal wheel being eccentrically assembled on said rotating shaft, said at least one Oldham coupling being set between said at least one cycloidal wheel and said input flange or between said at least one cycloidal wheel and said output flange;
a plurality of rollers set between said housing and said input flange and between said housing and said output flange; and
a plurality of spacers as claimed in claim 1, each said spacer being set between two adjacent said rollers, each said spacer optionally using said first roller accommodating grooves or said second roller accommodating grooves of said first surface to support one said roller and each said spacer optionally using said first roller accommodating grooves or said second roller accommodating grooves of said second surface to support another said roller.

\* \* \* \* \*